Patented May 19, 1931                                                                 1,805,954

UNITED STATES PATENT OFFICE

HAROLD A. MORTON, OF AKRON, OHIO

SOAP AND SOAP PRODUCTS AND STABILIZING AGENT AND PROCESS

No Drawing.   Application filed August 17, 1928.   Serial No. 300,372.

This invention relates to the manufacture of soap and soap products, and more particularly soap or soap products made from ingredients, one or more of which ordinarily deteriorate, or develop rancidity, in a relatively short time, and the object of the present invention is to inhibit or retard this action by incorporating in the soap stock, or soap, or in one or more of the ingredients used in the manufacture thereof, a small quantity of a hydroglyoxaline derivative.

I shall hereinafter enumerate a number of the substances which may be incorporated in, or added to, the soap or to the ingredients customarily employed in the manufacture thereof, for preventing or retarding deterioration or rancidity.

There are a great number of such hydroglyoxaline derivatives which function in this manner. These derivatives are designated in this specification by the accustomed nomenclature now in general use. The basic material, glyoxaline, from which these substances are derived is usually given the following chemical formula:

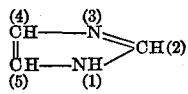

The substances described in this specification are hydroglyoxalines or substituted hydroglyoxalines and their derivatives. In general they may be prepared by heating a 1—2 diamino ethane derivative with the desired aldehyde, although other methods of preparation may be employed.

Among substances which may be used in carrying my invention into effect, the following may be identified:

2-4-6 triphenyl dihydroglyoxaline
2-4-5 trifuryl dihydroglyoxaline
2-4-5 tritolyl dihydroglyoxaline
1-3 di phenyl tetra hydroglyoxaline
1-3 di ortho tolyl tetra hydroglyoxaline
1-3 di para tolyl tetra hydroglyoxaline
1-3 di xylyl tetra hydroglyoxaline
1-3 di alpha naphthyl tetra hydroglyoxaline
1-3 di beta naphthyl tetra hydroglyoxaline
1-3 phenyl ortho tolyl tetra hydroglyoxaline
1-3 phenyl alpha naphthyl tetra hydroglyoxaline
1-3 di phenyl 2-methyl tetra hydroglyoxaline
1-3 di phenyl 2-vinyl tetra hydroglyoxaline
1-3 di phenyl 2-propyl tetra hydroglyoxaline
1-3 di phenyl 4-pseudo butyl tetra hydroglyoxaline
1-3 di phenyl 2-propenyl tetra hydroglyoxaline
1-3 di phenyl 2-furyl tetra hydroglyoxaline
1-3 di phenyl 2-hexyl tetra hydroglyoxaline
1-2 di phenyl 3-beta naphthyl tetra hydroglyoxaline
1-3 phenyl beta napththyl 2-furyl tetra hydroglyoxaline
1-3 di alpha naphthyl 2-propyl tetra hydroglyoxaline
1-2-3 triphenyl tetra hydroglyoxaline
1-3 di phenyl 2-methoethyl tetra hydroglyoxaline
1-3 di ortho tolyl 2-propyl tetra hydroglyoxaline
1-3 di para tolyl 2-methyl tetra hydroglyoxaline
1-3 di xylyl 2-furyl tetra hydroglyoxaline
1-3 di alpha naphthyl 2-propenyl tetra hydroglyoxaline
1-3 di alpha naphthyl 2-phenyl tetra hydroglyoxaline
1-3 di beta naphthyl 2-methyl tetra hydroglyoxaline
1-3 phenyl ortho tolyl 2-propyl tetra hydroglyoxaline
1-3 di phenyl 4-methyl tetra hydroglyoxaline
1-3 di ortho tolyl 4-methyl tetra hydroglyoxaline
1-3 di para tolyl 4-methyl tetra hydroglyoxaline
1-3 di xylyl 4-methyl tetra hydroglyoxaline
1-3 di alpha naphthyl 4-methyl tetra hydroglyoxaline
1-3 di beta naphthyl 4-methyl tetra hydroglyoxaline
1-3 di phenyl 4-ethyl tetra hydroglyoxaline
1-3 di para tolyl 4-ethyl tetra hydroglyoxaline
1-3 di alpha naphthyl 2-methyl tetra hydroglyoxaline
1-3 di phenyl 2-propyl 4-methyl tetra hydroglyoxaline
1-3 phenyl para tolyl 2-thio tetra hydroglyoxaline
1-3 di phenyl 2-thio tetra hydroglyoxaline
1-3 ortho tolyl xylyl 2-thio tetra hydroglyoxaline
1-3 di phenyl 2-thio 4-methyl tetra hydroglyoxaline
1-3 di phenyl 2-thio 4-5-dimethyl tetra hydroglyoxaline
1-3 di phenyl 2-4-dimethyl tetra hydroglyoxaline
1-3 di phenyl 2-vinyl 4-methyl tetra hydroglyoxaline
1-3 di phenyl 2-propenyl 4-methyl tetra hydroglyoxaline
1-3 di phenyl 2-furyl 4-methyl tetra hydroglyoxaline
1-3 di phenyl 2-hexyl 4-methyl tetra hydroglyoxaline
1-3 di phenyl 2-methoethyl 4-methyl tetra hydroglyoxaline
1-2-3 triphenyl 4-methyl tetra hydroglyoxaline
1-3 di ortho tolyl 2-4-dimethyl tetra hydroglyoxaline
1-3 di para tolyl 2-propyl 4-methyl tetra hydroglyoxaline
1-3 di xylyl 2-furyl 4-methyl tetra hydroglyoxaline
1-3 di alpha naphthyl 2-phenyl 4-methyl tetra hydroglyoxaline
1-3 di beta naphthyl 2-propenyl 4-methyl tetra hydroglyoxaline
1-3 di phenyl 4-5-dimethyl tetra hydroglyoxaline
1-3 di phenyl 2-methyl 4-ethyl tetra hydroglyoxaline
1-3 di ortho tolyl 2-vinyl 4-ethyl tetra hydroglyoxaline
1-3 di xylyl 2-propyl 4-ethyl tetra hydroglyoxaline
1-3 di alpha naphthyl 2-phenyl 4-ethyl tetra hydroglyoxaline
1-3 di phenyl 4-4-dimethyl tetra hydroglyoxaline
1-3 di ortho tolyl 4-4-dimethyl tetra hydroglyoxaline
1-3 di para tolyl 4-4-dimethyl tetra hydroglyoxaline
1-3 di xylyl 4-4-dimethyl tetra hydroglyoxaline
1-3 di alpha naphthyl 4-4-dimethyl tetra hydroglyoxaline
1-3 di beta naphthyl 4-4-dimethyl tetra hydroglyoxaline
1-3 di phenyl 2-propyl 4-pseudo butyl tetra hydroglyoxaline
1-3 di phenyl 2-4-5-trimethyl tetra hydroglyoxaline
1-3 di phenyl 2-propenyl 4-5-dimethyl tetra hydroglyoxaline
1-3 di phenyl 2-propyl 4-5-dimethyl tetra hydroglyoxaline
1-3 di phenyl 2-furyl 4-5-dimethyl tetra hydroglyoxaline
1-2-3 triphenyl 4-5-dimethyl tetra hydroglyoxaline
1-3 di phenyl 2-vinyl 4-5-dimethyl tetra hydroglyoxaline
1-3 di ortho tolyl 2-furyl 4-5-dimethyl tetra hydroglyoxaline
1-3 di para tolyl 2-phenyl 4-5-dimethyl tetra hydroglyoxaline
1-3 di xylyl 2-vinyl 4-5-dimethyl tetra hydroglyoxaline
1-3 di alpha naphthyl 2-propyl 4-5-dimethyl tetra hydroglyoxaline
1-3 di beta naphthyl 2-4-5-trimethyl tetra hydroglyoxaline
1-3 di phenyl 2-4-4-trimethyl tetra hydroglyoxaline
1-3 di phenyl 2-vinyl 4-4-dimethyl tetra hydroglyoxaline
1-2-3-triphenyl 4-4-dimethyl tetra hydroglyoxaline
1-3 di ortho tolyl 2-propyl 4-4-dimethyl tetra hydroglyoxaline
1-3 di phenyl 4-4-5-trimethyl tetra hydroglyoxaline
1-3 di phenyl 2-4-4-5-tetra methyl tetra hydroglyoxaline
1-3 di phenyl 1-2-propyl 4-4-5-trimethyl tetra hydroglyoxaline
1-2-3 triphenyl 4-4-5-trimethyl tetra hydroglyoxaline As indicated in the foregoing examples, the C atom in the 2 position of substituted 2-3-di hydroglyoxaline (or of substituted 2-3-4-5-tetra hydroglyoxaline) may have attached thereto any of the following: H, S, $CH_3$, $CH_3CH_2$, $CH_3CH_2CH_2$, $(CH_3)_2CH$, $CH_3CH_2CH_2CH_2$, $(CH_3)_2$, $CH.CH_2$, $CH_3CH_2CH_2CH_2CH_2$, $(CH_3)_2CH.CH_2CH_2$, $C_6H_5$, $C_6H_4CH_3$, $C_6H_3(CH_3)_2$, $C_6H_5CH_2$, $CH_2CH=CH$, $CH_2=CH$, $CH_3CH_2CH_2CH=C(C_2H_5)$, $C_3H_3O$, $CH_3CH_2CH_2CH_2CH_2CH_2$, or in general any aliphatic or aromatic groups, whether saturated or unsaturated. These radicals I consider members of the class which may be designated, and in some appended claims are identified, by the term "2 modifying group."

Independent of the special member which may be used in "2 modifying group", one or more of the hydrogen atoms which are attached to the nitrogen atoms in the 1—3 positions may be replaced by any of the following: $CH_3$, $CH_3CH_2$, $CH_3CH_2CH_2$, $(CH_3)_2CH$, $CH_3CH_2CH_2CH_2$, $(CH_3)_2CH.CH_2$, $CH_3CH_2CH_2CH_2CH_2$, $(CH_3)_2CH.CH_2CH_2$, $C_6H_5$, $C_6H_4CH_3$, $C_6H_3(CH_3)_2$, $C_6H_5CH_2$, $CH_2CH=CH$, $CH_2=CH$, $CH_3CH_2CH_2CH=C(C_2H_5)$, $C_4H_3O$, $CH_3CH_2CH_2CH_2CH_2CH_2$, or in general any aliphatic or aromatic group, whether saturated or unsaturated. These radicals I consider members of a class which may be designated, and in some of the appended claims are identified, by the term "1—3 replacement group."

One or both of the C atoms may also in the 4—5 positions have attached thereto one or more of the following: H, $CH_3$, $CH_3CH_2$, $CH_3CH_2CH_2$, $(CH_3)_2CH$, $CH_3CH_2CH_2CH_2$, $(CH_3)_2CH.CH_2$, $CH_3CH_2CH_2CH_2CH_2$, $(CH_3)_2CH.CH_2CH_2$, $C_6H_5$, $C_6H_4CH_3$, $C_6H_3(CH_3)_2$, $C_6H_5CH_2$, $CH_2CH=CH$, $CH_2=CH$, $CH_3CH_2CH_2CH=C(C_2H_5)$, $C_4H_3O$, $CH_3CH_2CH_2CH_2CH_2$, or in general any aliphatic or aromatic groups, whether saturated or unsaturated. These I consider members of a class which may be designated, and in some of the appended claims I have identified by the term "4—5 modifying group."

It is to be understood, however, that strongly negative groups such as $C_6H_5CO$, $CH_3CO$, or groups containing halogens, or nitro groups, may not be used in any position of the compound.

The above examples which are of value in practicing this invention, serve to indicate the wide range of materials of this type which are of value in the stabilization of soap. However, they are given only as typical examples and modifications may be made without departing from the spirit of the invention.

One of the preferred members of the above series is, 1—3 diphenyl 2-propyl terta hydroglyoxaline. One method of preparing this material is to heat 100 parts of 1—2 di (phenyl amino) ethane dissolved in alcohol with 40 parts of butyraldehyde under reflux for several hours. Upon cooling and crystallizing there is obtained a cream colored solid, which is dried and is then ready for use.

The tetra hydroglyoxaline derivatives referred to in this specification are prepared in general by the action of aldehydes on the corresponding 1—2 diamino ethane derivatives and are considered to have the glyoxaline constitution as given. However, I do not wish to be bound by any of the theories or constitutions given in this specification but desire to protect the class of materials formed in this manner.

The thio tetra hydroglyoxaline derivatives are prepared in general by the action of thio carbonyl chloride on the corresponding 1—2 diamino ethane derivatives and are considered to have the hydroglyoxaline constitution. However, I do not wish to be bound by this theory but desire to claim that class of materials formed by the reaction of carbon disulphide and 1—2 diamino ethane derivatives.

The amount of the selected one of these substances which may be added to the ordinary soap, or soap stock, or ingredients used in the manufacture thereof, for effecting the desired result, may be varied, but in general it will be found that good results may be obtained by adding, upon a weight basis, from 0.01% to 1.0% of the stabilizing agent to the soap or soap stock.

In utilizing my invention, the stabilizing agent may be introduced at any stage of the process of soap manufacture. For example, after the fatty acid has been obtained in the usual manner and has been saponified to produce a soap stock, I thoroughly incorporate therein 0.01% to 1.0% of 1—3 diphenyl 2-propyl tetra hydroglyoxaline. The material is then dried in the usual manner and may be marketed in cakes, flakes, or any other form as may be desired. However, I may add the stabilizing agent to the oils or fats before hydrolysis, or saponification, or to the fatty acid before saponification.

The stabilizing agent aforesaid, may, however be incorporated into the soap flakes, or into the solidified soap, while it is being passed through the mill, or plodder, or introduced as an added ingredient to soap solutions, or to so-called liquid soaps.

Practically any method whereby the stabilizing agent may be suitably incorporated in the final soap product will be found effective in preventing decomposition, or rancidification thereof.

What I claim is:

1. A soap having incorporated therein, a di-aryl tetra hydroglyoxaline.

2. A soap having incorporated therein a tetra hydroglyoxaline derivative, wherein, aromatic radicals are substituted in the 1—3 positions and aliphatic radicals in one of the 2—4—5 positions.

3. A soap having incorporated therein a tetra hydroglyoxaline derivative, wherein, aromatic radicals are substituted in the 1—3 positions and in one or more of the 2—4—5 positions.

4. A soap having incorporated therein a tetra hydroglyoxaline derivative, wherein, aromatic radicals are substituted in the 1—3 positions and an aliphatic radical in the 2 position.

5. A soap having incorporated therein a derivative of tetra hydroglyoxaline, wherein, the carbon atom in the 2 position has attached thereto a radical which is a member of the "2 modifying group," substantially as described.

6. A soap having incorporated therein a tetra hydroglyoxaline derivative, wherein, the carbon atom in the 2 position has attached thereto an aliphatic radical.

7. A soap having incorporated therein a tetra hydroglyoxaline derivative, wherein, the carbon atom in the 2 position has attached thereto a propyl radical.

8. A soap having incorporated therein a tetra hydroglyoxaline derivative, wherein, one of the hydrogen atoms attached to the nitrogen atoms in the 1 or 3 positions is replaced by a radical which is a member of the "1—3 replacement group."

9. A soap having incorporated therein a tetra hydroglyoxaline derivative, wherein, one of the hydrogen atoms attached to the nitrogen atoms in the 1 or 3 positions is replaced by an aliphatic radical.

10. A soap having incorporated therein a derivative of tetra hydroglyoxaline wherein, one of the hydrogen atoms attached to the nitrogen atoms in the 1 or 3 positions is replaced by an aromatic radical.

11. A soap having incorporated therein a derivative of tetra hydroglyoxaline, wherein, one of the hydrogen atoms attached to the nitrogent atoms in the 1—3 positions is replaced by a phenyl radical.

12. A soap having incorporated therein a derivative of tetra hydroglyoxaline, wherein, both hydrogen atoms attached to the nitrogen atoms in the 1—3 positions are replaced by a radical which is a member of the "1—3 replacement group."

13. A soap having incorporated therein a derivative of tetra hydroglyoxaline, wherein, both hydrogen atoms attached to the nitrogen atoms in the 1—3 positions are replaced by an aromatic radical.

14. A soap having incorporated therein a derivative of tetra hydroglyoxaline, wherein, both hydrogen atoms attached to the nitrogen atoms in the 1—3 positions are replaced by a phenyl radical.

15. A soap having incorporated therein a derivative of tetra hydroglyoxaline, wherein, each of the carbon atoms in the 4—5 positions has a radical attached thereto which is a member of the "4—5 modifying group."

16. A soap having incorporated therein a derivative of tetra hydroglyoxaline, wherein, each of the carbon atoms in the 4—5 positions has two radicals attached thereto both of which are members of the "4—5 modifying group."

17. A soap having incorporated therein a derivative of tetra hydroglyoxaline, wherein each of the carbon atoms in the 4—5 positions has a hydrogen atom attached thereto and substituted in one or more of the 1—2—3 positions by a hydrocarbon radical.

18. A soap having incorporated therein a derivative of tetra hydroglyoxaline, wherein, each of the carbon atoms in the 4—5 positions has two hydrogen atoms attached thereto and substituted in one or more of the 1—2—3 positions by a hydrocarbon radical.

19. A soap having incorporated therein a 1—3 diphenyl 2-propyl tetra hydroglyoxaline.

20. The method of stabilizing a soap which comprises incorporating therein a derivative of hydrogenated glyoxaline containing no strongly negative substituent groups.

21. A soap stabilized by having incorporated therein a small amount of a derivative of hydrogenated glyoxaline containing no strongly negative substituent groups.

22. A soap stabilized by having incorporated therewith from 0.10% to 1% of a derivative of hydrogenated glyoxaline containing no strongly negative substituent groups.

23. A soap having incorporated therein a derivative of dihydroglyoxaline containing no strongly negative substituent groups.

24. A soap having incorporated therein a derivative of tetrahydroglyoxaline containing no strongly negative substituent groups.

25. A soap having incorporated therein hydroglyoxalines in which the substituents in the 1—3—4—5 positions are taken from the group consisting of hydrogen, hydrocarbon and furyl residues, and in the 2 position from the group consisting of hydrogen, hydrocarbon and furyl residues, and sulphur, and containing at least one substituent other than hydrogen.

26. A soap having incorporated therein hydroglyoxalines in which the substituents in the 1—3 positions are taken from the group consisting of hydrogen, hydrocarbon and furyl residues, and in the 2 position from the group consisting of hydrogen, hydrocarbon and furyl residues, and sulphur, and containing at least one substituent other than hydrogen.

27. A soap having incorporated therein hydroglyoxalines in which the substituents in the 1—3 positions are taken from the group consisting of hydrogen, hydrocarbon and furyl residues, and containing at least one substituent other than hydrogen.

28. A soap having incorporated therein hydroglyoxalines in which the substituents in the 2 position are taken from the group consisting of hydrogen, hydrocarbon and furyl residues, and sulphur, and containing at least one substituent other than hydrogen.

29. A soap having incorporated therein hydroglyoxalines in which the substituents in the 1—3—4—5 positions are taken from the group consisting of hydrogen and hydrocarbon residues, and in the 2 position from the group comprising hydrogen, sulphur and hydrocarbon residues, and having at least one substituent other than hydrogen.

30. A soap having incorporated therein hydroglyoxalines having hydrogen atoms as the 4—5 substituents, and as the 1—3 substituents a member of the group consisting of hydrogen, hydrocarbon and furyl residues, and as the 2 substituents a member of the group comprising hydrogen, sulphur, and hydrocarbon and furyl residues, and having at least one substituent other than hydrogen.

31. A soap having incorporated therewith hydroglyoxalines having hydrogen atoms as the 4—5 substituents, and as the 1—3 substituents members of the group consisting of hydrogen, hydrocarbon and furyl residues, and having at least one substituent other than hydrogen.

32. A soap having incorporated therewith hydroglyoxalines having hydrogen atoms as the 4—5 substituents, and as substituents in the 2 position members of the group consisting of hydrogen, sulphur and hydrocarbon and furyl residues.

33. The product described in claim 30 in which there are two hydrogen atoms attached to each 4—5 C atom.

34. The product described in claim 31 in which there are two hydrogen atoms attached to each 4—5 C atom.

35. The product described in claim 32 in which there are two hydrogen atoms attached to each 4—5 C atom.

In testimony whereof I affix my signature.

HAROLD A. MORTON.